United States Patent [19]
Hinterlong et al.

[11] Patent Number: 5,394,498
[45] Date of Patent: Feb. 28, 1995

[54] OPTICAL FIBER ARRAY AND PROCESS OF MANUFACTURE

[75] Inventors: Stephen J. Hinterlong, Elburn; Robert A. Novotny; Jose M. Sasian-Alvarado, both of Naperville, all of Ill.

[73] Assignee: AT&T Corp., Murray Hill, N.J.

[21] Appl. No.: 148,039

[22] Filed: Nov. 5, 1993

[51] Int. Cl.[6] ............................................. G02B 6/04
[52] U.S. Cl. ..................................... 385/115; 264/1.1
[58] Field of Search .............. 385/115, 116, 121, 123, 385/127, 85, 80, 88; 359/900; 264/1.1, 1.5, 1.7

[56] References Cited

U.S. PATENT DOCUMENTS

| | | | |
|---|---|---|---|
| 4,082,421 | 4/1978 | Auracher et al. | 350/96.22 |
| 4,274,706 | 6/1981 | Tangonan | 385/130 |
| 4,293,188 | 10/1981 | McMahon | 385/124 |
| 4,948,219 | 8/1990 | Seino et al. | 350/96.20 |
| 4,952,263 | 8/1990 | Kakii et al. | 156/153 |
| 4,960,316 | 10/1990 | Berkey | 350/96.21 |
| 5,032,718 | 7/1991 | Murakami | 250/227.2 |
| 5,065,006 | 11/1991 | Nakamura et al. | 250/208.1 |
| 5,121,454 | 6/1992 | Iwano et al. | 385/60 |
| 5,124,543 | 6/1992 | Kawashima | 250/208.1 |
| 5,138,145 | 8/1992 | Nakamura et al. | 250/208,1 |
| 5,266,828 | 11/1993 | Nakamura et al. | 385/49 |

OTHER PUBLICATIONS

"A Fiber-Optic-Cable Connector", C. M. Miller–1975 AT&T–The Bell System Technical Journal–vol. 54, No. 9, Nov. 1975, pp. 1547–1553.
"Accurate Silicon Spacer Chips for an Optical-Fiber Cable Connector", C. M. Schroeder–1978 AT&T–The Bell System Technical Journal, vol. 57, No. 1, Jan. 1978, pp. 91–96.
"High Precision Two Dimensional Fibre-Array in Silicon V-Groove Technique", U. Danzer, et al., Angewandte Optik, Physikalisches Institut der Universitat Erlangen-Nurnberg-Annual Report 1992.
"Fabrication and Characterization of a 2-D Fiber Array", G. A. Koepf, et al., *Applied Optics,* vol. 23, No. 20, Oct. 15, 1984, 1984, pp. 3515–3516.
"Put-In Microconnectors for Alignment-Free Couling of Optical Fiber Arrays", A. Sasaki, et al., 1992 IEEE, 1041-1135/92$03,00, pp. 908–910.
"Novel High-Density Collimator Module", K. Koyabu, et al., OFC/IOOC, 1993 Technical Digest, pp. 2–3.
"Opto-Mechanical Alignment and Assembly of 2D-Array Components", N. R. Basavanhally, AT&T Bell Laboratories, Engineering Research Center-P. O. Box 900, Princeton, N.J., 08540 (No page No.).

*Primary Examiner*—Akm E. Ullah
*Attorney, Agent, or Firm*—Jack R. Penrod

[57] ABSTRACT

A fiber optical array with precision fiber and positioning and a process for manufacturing such an array. The position of the ends of the optical fibers depends upon placement within a target that has been lithographed using highly precise lithography similar to that used in VLSI integrated circuits. The placement of an end with its core within its target is performed with the aid of microscopes and micro-manipulators. Once an end is in the proper location, ultraviolet curable adhesive is used to permanently fix its position precisely. Arrays having positional precision to within 1 micrometer are achievable by this invention.

16 Claims, 4 Drawing Sheets

OPTICAL FIBER ARRAY AND PROCESS OF MANUFACTURE

TECHNICAL FIELD

This invention relates to fiber optic arrays, and more particularly to fiber optic arrays that have the individual optical fibers permanently positioned with high spatial and angular precision.

BACKGROUND OF THE INVENTION

Free space optical switching systems and photonic computing systems utilize macroscopic optical elements such as holograms, gratings, lenses, mirrors, and fiber optic arrays as basic building blocks. In such systems information is carried by arrays of light beams that are collimated, manipulated, and focused onto spatial light modulators in a stage by stage fashion. Fiber optic arrays may serve as input terminals, output terminals and interstage couplers for such systems. Precision fiber optic arrays are important support components of such systems.

Examples of known optical switching systems and photonic computing systems are known from: "An All Optical Shift Register Using Symmetric Self Electro-optic Effect Devices," published in OSA Proceedings on Photonic Switching, Vol. 3, pp. 192–195, 1989, edited by J. E. Midwinter and H. S. Hinton, "An All Optical Realization of a 2×1 Free Space Switching Node," published in Photonics Technology Letters, No. 8, 1990, pp. 600–602 by E. Kerbis, T. J. Cloonan, and F. B. McCormick; "An All Optical Implementation of a 3D Crossover Switching Network," published in Photonics Technology Letters, No. 6, 1990, pp. 438–440 by T. J. Cloonan, M. J. Herron, F. A. P. Tooley, G. W. Richards, F. B. McCormick, E. Kerbis, J. L. Brubaker, and A. L. Lentine; "Module for Optical Logic Circuits using Symmetric Self Electro-Optic Effect Devices," published in Applied Optics, No. 14, 1990, pp. 2164–2170 by M. E. Prise, N. C. Craft, R. E. LaMarche, M. M. Downs, S. J. Walker, L. A. D'Asaro, and L. M. F. Chirovsky; "Parallel Interconnection of Two 64×32 Symmetric Self Electro-optic Effect Device Arrays," published in Electronics Letters, No. 20, 1991, pp. 1869–1871 by F. B. McCormick, F. A. P. Tooley, J. M. Sasian, J. L. Brubaker, A. L. Lentine, T. J. Cloonan, R. L. Morrison, S. L. Walker, and R. J. Crisci; "Optomechanics of a Free Space Switch: The System," published in Optomechanics and Dimensional Stability, Proceedings of SPIE, No. 1533, 1991, pp. 97–114 by F. B. McCormick, F. A. P. Tooley, J. L. Brubaker, J. M. Sasian, T. J. Cloonan, A. L. Lentine, S. J. Hinterlong, and M. J. Herron; "Experimental Investigation of a Free Space Optical Switching Network Using S-SEEDs," published in Applied Optics, Vol. 31, No. 26, 1992, pp. 5431–5446 by F. B. McCormick, F. A. P. Tooley, T. J. Cloonan, J. L. Brubaker, A. L. Lentine, R. L. Morrison, S. J. Hinterlong, M. J. Herron, S. L. Walker, and J. M. Sasian; and "A Six-Stage Digital Free-Space Optical Switching Network Using S-SEEDs," published in Applied Optics, Oct. (1992) by F. B. McCormick, T. J. Cloonan, F. A. P. Tooley, A. L. Lentine, J. M. Sasian, J. L. Brubaker, R. L. Morrison, S. L. Walker, R. J. Crisci, R. A. Novotny, S. J. Hinterlong, H. S. Hinton, and E. Kerbis. These articles chronical the progress of optical and photonic system technology as it grows in complexity and functionality.

The potential of free space optical switching systems to interconnect a larger number of communication channels at high bit rates has spurred the development of such systems. The potential of photonic computing systems for increased processing rates and bit transfer rates through the use of optical and photonic components has spurred similar photonic computing system development. These potential benefits have motivated the development of high precision fiber optic arrays to communicate light beam borne data to and from free space optical switching systems and photonic computing systems. High precision fiber optic arrays have been easy to specify, but difficult to physically realize, especially if high precision positioning of the optical fibers is required. Several fabrication techniques have been reported in various publications. For example, Miller describes a 2-D array of optical fibers that was made by stacking a number of linear arrays of optical fibers that were supported by grooved spacers in "A Fiber Optic Cable Connector," The Bell Technical Journal, Vol. 54, No. 9, 1547–1555, 1975. These spacers were manufactured by the precise etching of grooves in both sides of a silicon wafer, potting all the optical fibers in place and polishing the resulting assembly. This technique has been used to assemble a fiber array with a maximum positioning error of 10 micrometers as reported by U. Danzer, P. Kipfer, K. Zufi, J. Lindolf, and J. Schwider, in "High Precision Two Dimensional Fibre Array in Silicon V-Groove Technique," Angewandte Optik, Physikalisches Institut der Universitat Erlangen, Annual Report 1992.

In another effort, an alignment-free assembly technique has been developed where fiber end positioning to within plus or minus 8 micrometers was achieved. This technique is described by A. Sasaki, T. Baba, and K. Iga in "Put-in Microconnectors for Alignment-free Coupling of an Optical Fiber Array," IEEE Photonics Technology Letters, Vol. 4 No. 5, pp. 908–910, 1992. In this known technique, an array of sockets with centering plugs for optical fibers were micro-fabricated to achieve self-centering of each optical fiber upon insertion and to expedite assembly also.

G. A. Koepf and B. J. Markey describe another technique involving arrays of precision holes in substrates to insert and locate optical fibers with a standard deviation of 12.6 micrometers in, "Fabrication and Characterization of a 2-D Fiber Array," Applied Optics Vol. 23, No. 2, pp. 3515–3516, 1984. Fiber optical arrays using precision holes to position the optical fibers have also been described by Basavanhally in "Opto-mechanical Alignment and Assembly of 2-D Array Components," Technical Digest of the IEEE Princeton Section Sarnoff Symposium, Mar. 26, 1992. G. M. Proudley, C. Stace, H. White also describe their fiber optic array fabrication technique in their article "Fabrication of 2-D Fibre-Optic Arrays for an Optical Crossbar Switch," submitted to Optical Engineering.

Koyabu, F. Ohira, T. Yamamoto, and S. Matsuo have realized a 2-D fiber optic array with a mean fiber positioning error of 3 micrometers by inserting the optical fibers into microferrules and stacking the fiber optic and microferrule assembly to create the array. This technique is described in their article "Novel High Density Collimator Module," Technical Digest, Conference on Optical fiber Communication/International Conference on Integrated Optics and Optical Fiber Communication, 1993 Technical Digest Series, Vol. 4, (Optical Society of America, Washington, D.C., 1993), pp. 2–3.

A common feature of these known techniques is that the final positioning of each optical fiber is accomplished by referencing each optical fiber to a mechanical jig or support through which the fibers pass. Thus, the precision of this mechanical jig or support limits the ultimate precision attainable. These known techniques, with their inherent mechanical limitations, are not precise enough to meet the requirements of the developing optical switching systems and the photonic computing systems. Thus, there is a need in the art to provide a high precision fiber optic array and a process for producing such an array.

It is an object of the present invention to provide a fiber optic array that is not limited by the precision of the mechanical support through which the optical fibers pass.

It is another object of the invention to provide a process for producing a high precision optical fiber array.

SUMMARY OF THE INVENTION

Briefly stated in accordance with one aspect of the invention the aforementioned objects are achieved by providing an optical fiber array in which the position of each individual fiber is determined with reference to a transparent substrate that has a precision pattern of targets formed thereon, instead of relying on a mechanical jig or support as a reference. Greater positioning accuracy is achieved by individually locating each optical fiber core in its correct position with respect to its target. Positioning accuracy is achieved by referencing light coming from each fiber core to a respective target of an array of targets that are lithographically formed on a transparent substrate. After positioning the core with respect to its target, the optical fiber is bonded in place by curing an adhesive that surrounds the fiber. An additional substrate containing an array of holes is located adjacent to the transparent substrate and serves as the foundation for the optical fiber array. The array of holes assures uniformity in optical fiber pointing, and relieves stress of the optical fibers from their bonded position within its target position against the transparent substrate.

In another aspect of the invention, the aforementioned objects are achieved by providing an optical fiber array having a plurality of optical fibers. The array also has a first substrate having a plurality of holes therein according to a first pattern. These holes are filled with an adhesive for holding the optical fibers. The array further includes a transparent substrate that has a plurality of rings on a surface thereof, each of said plurality of rings having a dark outer portion surrounding a circular transparent inner portion. The transparent substrate is positioned adjoining the first substrate and occluding one end of each of the plurality of holes. Each of the plurality of rings has a smaller inside diameter than each of the plurality of holes. The plurality of rings has a pattern that registers with the first pattern such that each of the plurality of rings is circumscribed by a respective hole of the plurality of holes at the occluded end thereof. Each of the plurality of optical fibers is inserted into a respective hole of the plurality of holes, adjusted to abut the inner portion of a respective ring of the hole and held in this position until the adhesive cures to permanently hold each optical fiber against the inner portion of its respective ring.

In another aspect of the invention the objects are achieved by providing a process for manufacturing an array of optical fibers. This process includes the steps of forming a plurality of holes according to an array pattern in a first substrate and filling this plurality of holes with an adhesive. This process also includes the steps of forming a pattern of rings on a transparent substrate which corresponds to the pattern of holes and locating the transparent substrate adjacent to the first substrate such that each of the plurality of rings is circumscribed by a respective hole of the plurality of holes. The process continues by inserting an end of each of a plurality of optical fibers through a respective hole of the plurality of holes and in a location against the transparent substrate within a respective ring of the plurality of rings and curing the adhesive in order to retain each of the plurality of optical fibers within its respective ring.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying figures in which:

DETAILED DESCRIPTION

Figure 1:
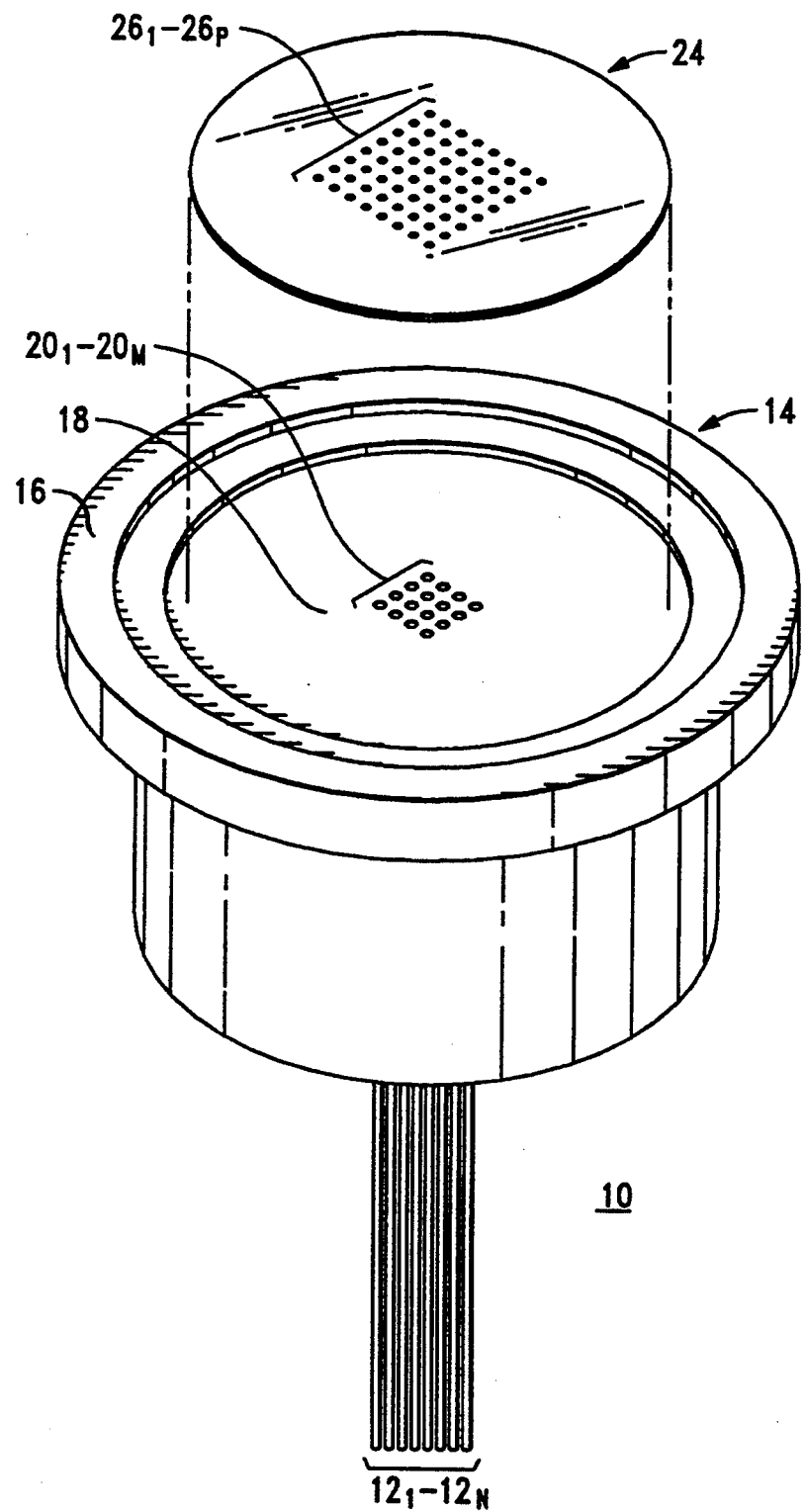
FIG. 1 is a perspective view of an optical fiber an:ay, that is partially exploded to show details.

Referring now to FIG. 1, a perspective view of an optical fiber array 10 is shown partially broken away to show details of the optical fibers $12_1$–$12_N$. Optical fibers $12_1$–$12_N$ pass through substrate 14, as explained later. Substrate 14 has a flange 16 to facilitate mounting to an external system, such as a free space optical switching system or a photonic computer system. Flange 16 has three coaxial cylindrical recesses that assist during adhesive application.

Substrate 14 has a surface 18 that forms the bottom of the third coaxial recess. An array of holes $20_1$–$20_M$ is bored in the surface 18. The embodiment shown in FIG. 1 has a 4×4 square pattern of holes, but this embodiment is given by way of example and not by way of limitation since larger arrays, as well as non-square arrays, are contemplated. The pattern of holes of shown in FIG. 1 was made by a computer controlled drilling machine boring into a substrate 14 of polymethyl methacrylate plastic, although those skilled in the art will recognize that other material could be used instead. Standard small diameter bits were used to bore the holes $20_1$–$20_M$. Using this equipment, the nominal hole diameter was 0.25 mm, the depth was 3.0 mm, and the hole spacing was 0.5 mm plus or minus 0.025 mm.

A transparent substrate 24, shown in an exploded portion of FIG. 1, may be made of quartz, glass or some other transparent substance. Transparent substrate 24 has a pattern of targets $26_1$–$26_p$ for centering optical fibers $12_1$–$12_N$. In the embodiment shown in FIG. 1, the targets $26_1$–$26_p$ have a circular or ring shape, but other shapes, such as squares, pentagons, hexagons, etc., could be used as the target shape instead. The inside diameter of the circular targets may be 6, 9, 12, or 65 micrometers depending on the core size of the optical fibers $12_1-12_N$. This range accommodates cores for single or multimode optical fibers in the array 10. The transparent substrate shown in FIG. 1 was fabricated using quartz that was 25 mm in diameter and 0.5 mm thick. The targets $26_1-26_p$ were formed by a microlithography technique which provide sub micrometer feature accuracy. The micro-lithography technique includes the evaporating of chromium, which leaves circular targets $26_1-26_p$ that extend approximately 40 nanometers beyond the surface of transparent substrate 24.

The pattern of targets $26_1-26_p$ is such that each of the holes $20_1-20_M$ matches up with a respective target of the pattern of targets $26_1-26_p$. The pattern of targets $26_1-26_p$ may be of the same scale, that is one target for each hole, or of a 1/N scale, that is only targets in every N th row and every N th column will match up and the other targets will not be used. For brevity, an embodiment of the invention in which the pattern of holes $20_1-20_M$ and the pattern of targets $26_1-26_p$ have the same scale will be described.

Substrate 24 is mounted and aligned on surface 18 of substrate 14 such that the pattern of targets $26_1-26_p$ is in registration with the pattern of holes $20_1-20_M$ and the center of each of the targets $26_1-26_p$ is substantially coaxial with the longitudinal axis of it respective hole of the pattern of holes $20_1-20_M$. Thus, each target is located at one end of its respective hole and with proper equipment, each target will be visible through its respective hole. After substrate 24 is mounted and aligned, it is affixed to substrate 14 to prevent any further motion relative to the pattern of holes $20_1-20_M$.

Figure 2:
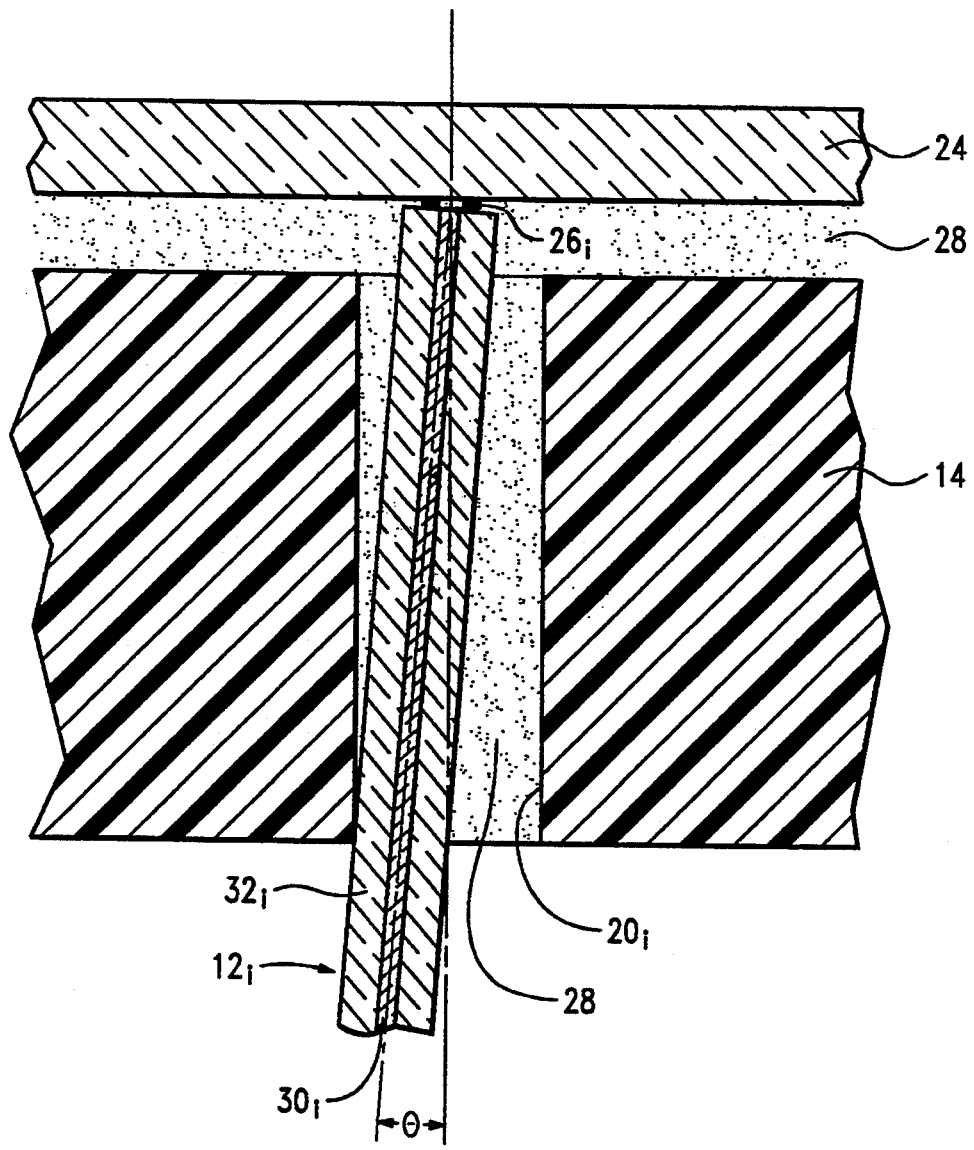
FIG. 2 is a cross section view that is broken away to show the relationship of a single hole and a single target.

Referring now to FIG. 2, the relationship of a representative target $26_1$, the ith target of the targets $26_1-26_p$, on the transparent substrate 24 and its respective hole $20_i$, the i th hole of the pattern of holes $20_1-20_M$, in the substrate 14 is shown in this broken away, cross sectional view. Target $26_i$ is registered and centered with respect to the ith hole $20_i$. Target $26_i$ faces hole $20_i$. Using a procedure and apparatus described below, hole $20_i$ has an adhesive 28 placed therein, has an optical fiber $12_i$ inserted in place in the center of target $26_i$, and has the adhesive 28 cured to hold optical fiber $12_i$ permanently in place. During this insertion and curing operation, there is no conflict between the adhesive 28 which fills hole $20_i$ and optical fiber $12_i$; however, prior to insertion the optical fiber $12_i$ must be clean to prevent any stray dust particles from interfering with the fiber's alignment or obstructing light emanating from the fiber. Each optical fiber $12_i$ has a core $30_i$, which is circumferentially surrounded by a cladding $32_i$. Typically, the core $30_i$ and the cladding $32_i$ are both made of the same material but have different indices of refraction. The core $30_i$ may either be a separate coaxial member circumferentially surrounded by cladding $32_i$ or core $30_i$ may be fused to cladding $32_i$ such that they form a unitary optical fiber with an integrated core. Even if the core $30_i$ and the cladding $32_i$ are not of the same material or fused, a precision array according to the invention can be achieved.

Another important parameter is the amount of fiber tilt $\Theta$, with respect to a normal to substrate 24. The fiber tilt $\Theta$ is the angular pointing error of optical fiber $12_i$. A worst case tilt $\Theta$ for optical fiber $12_i$ may be calculated if the fiber is considered as a rigid member. For a hole $20_i$ having a diameter of 0.25 mm, and a length of 3.0 mm, the worst case tilt of an optical fiber $12_i$ having a diameter of 0.125 mm and its core are located at the center of its target is given by the expression $\Theta=\arctan(0.0625/3.0)$, which is 1.2 degrees.

Moreover, when the core $30_i$ of the optical fiber $12_i$ and target substrate 24 become an optical unit after the adhesive cures, the effective angular pointing error is magnified by light refraction to an even greater value. Thus, for the above worst case example, if the index of refraction of substrate 24 is 1.5, the maximum effective pointing error of optical fiber $12_i$ connected to substrate 24 by cured adhesive $20_i$ becomes 1.8 degrees.

Optically, this error represents a lack of telecentricity and can cause a loss of light by beam vignetting. For example, if light from a fiber array with such a pointing error is collimated by an objective of 15 mm focal length, the beam wander at the exit pupil could be 0.45 mm. This represents approximately 1/6 the collimated beam diameter, if the a numerical aperture of the fibers is assumed to be 0.1.

Fortunately, the worst case tilt does not occur very often, so the effective tilt is typically much better than 1.8 degrees. Part of the reason that worst case tilt does not occur is that each optical fiber $12_i$ is not an ideally rigid body, rather it is an elastically deformable body. Since it is deformable to some extent, the response of the optical fiber $12_i$ to being physically forced against substrate 24 at an angle is a slight compression at the point of contact of its cleaved end, and a moment or couple about the point of contact which tends to force the cleaved end flat against substrate 24. The overall result being a reduction of any tilt angle $\Theta$ that existed before the contact of the optical fiber $12_i$ with substrate 24.

Figure 3:
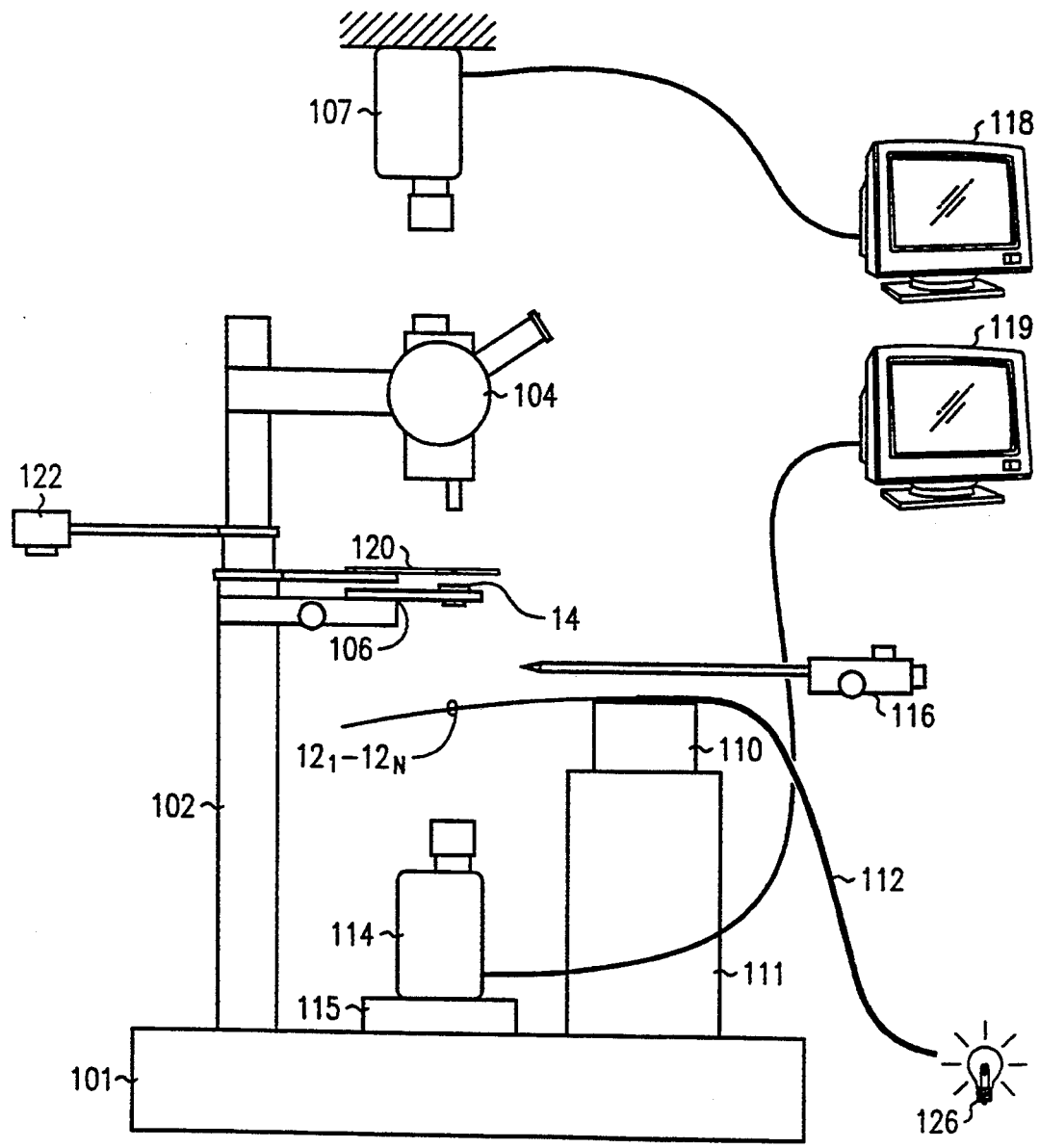
FIG. 3 is a pictorial diagram of an apparatus for assembling an optical fiber array according to the invention.

Referring now to FIG. 3, an apparatus 100 for assembling an optical fiber array is illustrated. Apparatus 100 has a base 101 and a support member 102 attached to and projecting from the base 101. Base 101 and support member 102 provide the structural strength and rigidity to maintain the precision of the overall apparatus 100. An optical microscope 104 is attached to support member 102 and faces a mounting platform 106. A first video camera 107 provides an operator with a video view from the optical microscope 104. In one embodiment of the invention, microscopic magnifications of 75× and 300× have been used, but other magnifications could be used instead. Further, those in the an will recognize that the functions of optical microscope 104 and video camera 107 could be combined in a magnifying video camera, which is deemed to be within the scope of the present invention.

A second mounting platform 110 is independently supported by member 111 from base 101. Mounting platform 110 is used to support a cable 112 of optical fibers $12_1-12_N$. A second video camera 114 is also supported from base 101 by member 115. This second video camera 114 is pointed at the underside of mounting platform 106.

A fiber manipulator 116, which is self supporting (not shown), is located near and within reach of mounting platforms 106 and 110. Fiber manipulator 116 is used by an operator or automated system (not shown) to manipulate M optical fibers of the optical fibers $12_1-12_N$ of the cable 112, one at a time, and insert each one into its respective hole of the holes $20_1-20_M$. Typically there are more optical fibers in the cable 112 than there are holes, but that allows for flexibility should one or more optical fibers be found defective. Two video displays 118 and 119 are located near the fiber manipulator 116 to provide a human operator with the video of both cameras 107 and 114 in order to position each fiber in its respective hole in substrate 14 and each core of each optical fiber up against its respective target $26_1-26_p$.

In one embodiment of the invention which uses an ultraviolet curable cement as adhesive 28 (shown in FIG. 2), a pinhole 120, is located directly above the end of the newly inserted optical fiber $12_1-12_N$ after it is inserted in its hole and located against its target. Once the pinhole 120 is in place, an ultraviolet light source 122 shines down through the pinhole 120 and cures only the adhesive 28 surrounding the newly inserted optical fiber. The cured adhesive holds the optical fiber in position and also stress relieves the end of each optical fiber which is bonded to substrate 24 from the rest of the optical fiber. After the adhesive is cured for one optical fiber, the pinhole 120 and ultraviolet light source 122 are moved out of the way of microscope 104.

Figure 4:
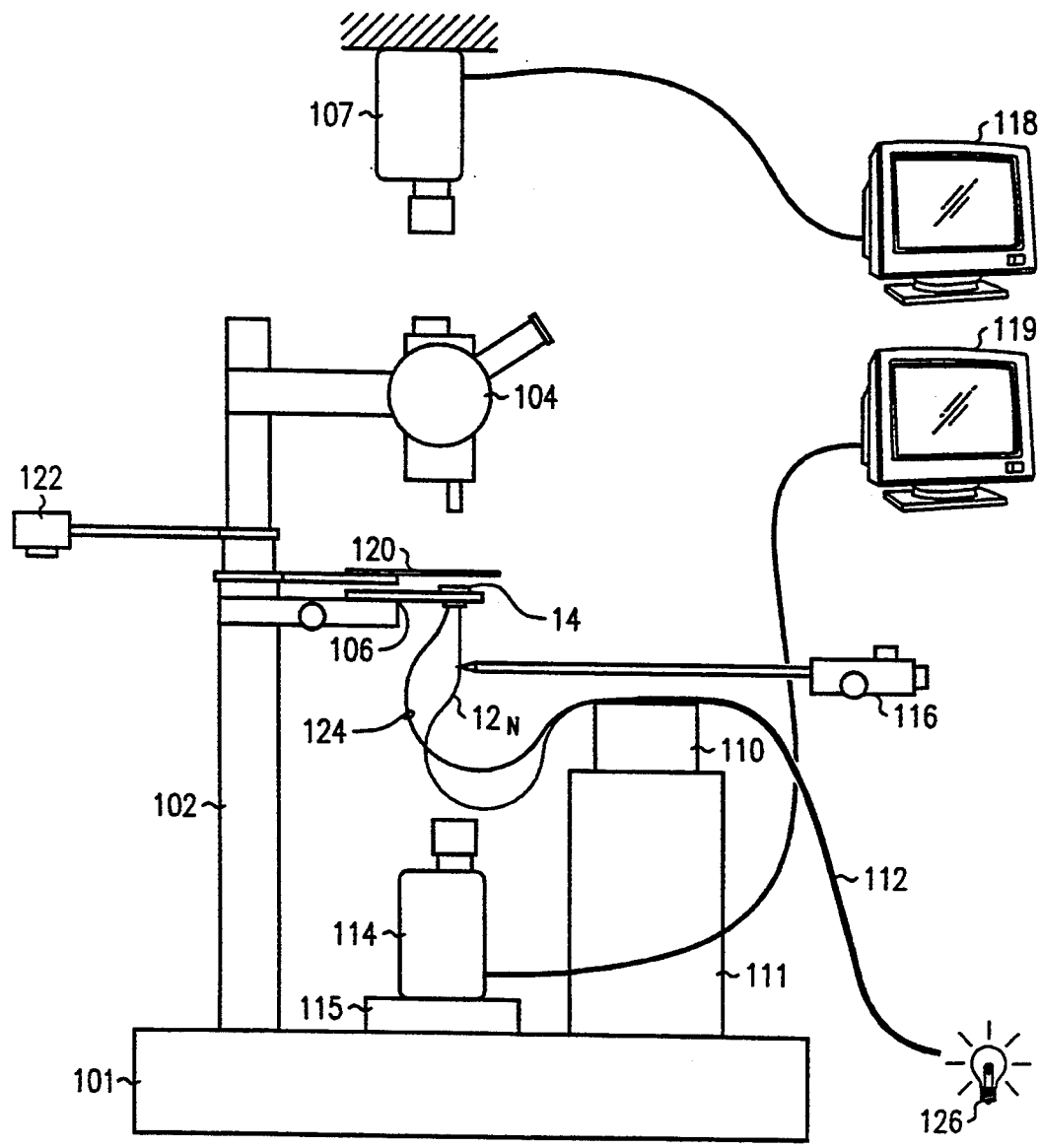
FIG. 4 is a pictorial diagram of the apparatus shown in FIG. 3 inserting an optical fiber to manufacture an optical fiber array.

FIG. 4 shows how the inserted and cured fibers are held back by a mechanic loop 124 by attachment to platform 110.

Assembly

Referring again to FIGS. 1 and 3, assembly of a preferred embodiment will be described. An array of holes $20_1-20_M$ were formed in the surface 18 by boring or other hole-forming technique to prepare substrate 14 for assembly. Similarly, targets $26_1-26_p$ were microlithographed on substrate 24 to prepare substrate 24 for assembly. Next, substrate 14 and its array of holes $20_1-20_M$ were filled with ultraviolet curing cement 28. Next, substrate 24 with targets $26_1-26_p$ was registered on surface 18 of substrate 14. Thus, targets $26_1-26_p$ faced the array of holes and were centered with respect to the holes $20_1-20_M$. The two recesses in flange 16 provide control for any excess of the ultraviolet curable adhesive 28 during application and control the formation of bubbles in the ultraviolet curable adhesive 28 that might interfere with fiber positioning. Large bubbles that could obstruct a fiber end must be eliminated from the area of targets $26_1-26_p$, but the design of substrates 14 and 24 allows small bubbles to be moved out of the way as a fiber end is inserted.

The substrate 14 with transparent substrate 24 mounted thereon and the adhesive 28 applied thereto was placed on mounting platform 106 such that it was visible through the microscope 104. The optical fibers $12_1-12_N$ used in this embodiment of the invention were from a ribbon cable 112 of 12 fibers, each optical fiber has an outside diameter of 125 micrometers, i.e., diameter of cladding and core.

To prepare the optical fibers $12_1-12_N$ for insertion and alignment by assembly apparatus 100, the fiber jacket of each optical fiber was stripped off and each of the optical fibers $12_1-12_N$ cleaved. Next, the fiber ribbon cable 112 was placed on the platform 110 and held in position by a restraint. A light source 126 was used to illuminate the un-stripped end of ribbon cable 112 so that the cores of the optical fibers $12_1-12_N$ were distinctly visible at the ends-to-be-glued.

Fiber manipulator 116 was used to sequentially grasp each optical fiber $12_1-12_N$ and insert it through its respective hole of the array of holes $20_1-20_M$. The light that emanated from each fiber core in conjunction with the sensitivity of video cameras 107, 114 made insertion of each of the optical fibers $12_1-12_N$ easy. Each optical fiber $12_1-12_N$ was pivoted on the lower rim of its respective hole $20_1-20_M$ such that alignment with respect to its target $26_1-26_p$ could be adjusted by horizontal movement of fiber manipulator 116, such as the manipulators made by Line Tool Company. After each core of each optical fiber $12_1-12_N$ has aligned with respective target $26_1-26_p$, each optical fiber $12_1-12_N$ was moved into contact with its respective target $26_1-26_p$ on substrate 24. The contact of each inserted fiber end with substrate 24 is a delicate operation and a piezo-electric drive mechanism, such as the LC amplifiers/PZ 300 unit made by Burleigh, (not shown) within manipulator 116 was used.

As each fiber end touches its respective target on the substrate 24, it tended to jump approximately 1 micrometer. Fortunately this jump, is consistent across all fibers so compensation for this jump can be made prior to the contact between the fiber end and substrate 24. This compensation is important because once a fiber end contacts substrate 24, its position becomes locked such that the fiber end cannot be moved by small horizontal movements of manipulator 116.

As each fiber end was moved vertically into its respective position against substrate 24, the section of each optical fiber $12_1-12_N$ between manipulator 116 and substrate 24 became gently bowed. This bow helps to maintain contact between each fiber end and the substrate 24 in the presence of vibrations or small deflections of assembly apparatus 100. After each fiber end was moved into its respective position, its ultraviolet curable adhesive 28 was selectively cured by UV light from UV light source 122 through pinhole 120, as explained previously.

Optical fibers $12_1-12_N$ of cable 112 were inserted and bonded in an orderly sequence to avoid interference between adjacent optical fibers during fabrication. Physical interference between optical fibers was further avoided by using fiber loop 124 each that after curing, each optical fiber $26_1-26_p$ was moved out of the way, as shown in FIG. 4.

After fabrication, targets $26_1-26_p$ provide a ready measure of horizontal fiber end positioning of the manufactured optical fiber array 10. For example, for a fiber array that has a target inner diameter 4 micrometers larger than the core of each fiber, if any core contacts the outer ring of its target, an error of at least 2 micrometers would have occurred.

Vertical positioning error of the fiber, if any, is mainly determined by the surface of the substrate 24 contacting the fiber end and any fiber end tilt. This error has already been discussed above with respect to FIG. 2.

Another embodiment includes an array of micro lens to match the numerical aperture of the optical fibers to that of the system to which it connects is incorporated into optical fiber array 10. In this micro lens embodiment, each of the targets $26_1-26_p$ has a corresponding micro lens in register therewith.

Thus, it will now be understood that there has been disclosed a precision optical fiber array, a process for manufacturing the precision optical fiber array and an apparatus for manufacturing the precision optical fiber array. While the invention has been particularly illustrated and described with reference to preferred embodiments thereof, it will be understood by those skilled in the art that various changes in form, details, and applications may be made therein. For example using computer imaging and robotics to manipulate each optical fiber into its position instead of a human operator to automate the manufacturing process. It is accordingly intended that the appended claims shall cover all such changes in form, details and applications which do not depart from the true spirit and scope of the invention.

What is claimed as new and desired to be secured by Letters Patent of the United States is:

1. An array of optical fibers comprising:
   a plurality of optical fibers;
   each of said plurality of optical fibers having a respective core,
   a first substrate having a plurality of holes therein, said plurality of holes having a first pattern;
   an adhesive filling each of said holes;
   a transparent substrate having a plurality of targets on a surface thereof, each of said plurality of targets having a dark outer portion surrounding a transparent inner portion;
   said transparent substrate adjoining said first substrate and occluding one end of each of said plurality of holes;
   each of said plurality of targets has a smaller inside diameter than each of said plurality of holes and said plurality of targets has a pattern that registers with said first pattern such that each of said plurality of holes has a respective target of said plurality of targets at the occluded end thereof; and
   each of said plurality of optical fibers is inserted into a respective hole of said plurality of holes, adjusted such that it abuts its respective target with its core circumscribed by an inner portion of its respective target and held in this abutting position until said adhesive is cured to permanently locate each said core within the inner portion of its respective target.

2. The array according to claim 1, wherein a distance dimension between said transparent substrate and said first substrate, a diameter dimension of each of said plurality of holes and a length dimension of each of said plurality of holes are selected to limit an amount that each optical fiber can vary from perpendicularity with respect to said transparent substrate.

3. The array according to claim 1 wherein said adhesive is of a type that cures upon exposure to ultraviolet light.

4. The array according to claim 2 wherein the ultraviolet adhesive is cured by shining a very limited amount of ultraviolet light onto the adhesive within each hole after the respective optical fiber therefor has been inserted into its respective hole and into the desired position abutting the inner portion of its respective target.

5. The array according to claim 1 wherein said plurality of targets are formed on said transparent substrate by a high precision lithographic process.

6. The array according to claim 5 wherein said transparent substrate is made of quartz.

7. The array according to claim 1, wherein each optical fiber is inserted by the use of a three dimensional positioner holding the optical fiber and positioned into the inner portion of its respective target with the aid of a magnifying device.

8. The array according to claim 7 wherein said adhesive is of a type that cures upon exposure to ultraviolet light.

9. The array according to claim 8 wherein the ultraviolet adhesive is cured by shining a very limited amount of ultraviolet light onto the adhesive within each hole after the respective optical fiber therefor has been inserted into its respective hole and into the desired position abutting the inner portion of its respective target.

10. The array according to claim 1, further comprising:
    a plurality of micro lenses, with each of said optical fibers having a respective micro lens; and
    each micro lens having substantially the same numerical aperture as it respective optical fiber.

11. A process for manufacturing an array of optical fibers, comprising the steps of:
    forming a pattern of targets on a transparent substrate;
    forming a plurality of holes according to an array pattern in a first substrate, said pattern of holes corresponds to said pattern of targets;
    filling said plurality of holes with an adhesive;
    locating said transparent substrate adjacent to said first substrate such that each of said plurality of targets is circumscribed by a respective hole of said plurality of holes;
    inserting an end of each of a plurality of optical fibers through a respective hole of said plurality of holes and in a location with its core against said transparent substrate within a respective target of said plurality of targets; and
    curing said adhesive to retain each of said plurality of optical fibers with its core within its respective target of said plurality of targets.

12. A process for manufacturing an array of optical fibers, comprising the steps of:
    forming a pattern of targets on a transparent substrate;
    forming a plurality of holes according to an array pattern in a first substrate, said pattern of holes corresponds to said pattern of targets;
    filling said plurality of holes with an adhesive;
    locating said transparent substrate adjacent to said first substrate such that each of said plurality of targets is circumscribed by a respective hole of said plurality of holes;
    stripping a jacket from each optical fiber of a plurality of optical fibers of a optical fiber cable;
    inserting an end of each of a plurality of optical fibers through a respective hole of said plurality of holes and in a location with its core against said transparent substrate within a respective target of said plurality of targets; and
    curing said adhesive to retain each of said plurality of optical fibers with its core within its respective target of said plurality of targets.

13. A process for manufacturing an array of optical fibers, comprising the steps of:
    forming a pattern of targets on a transparent substrate;
    forming a plurality of holes according to an array pattern in a first substrate, said pattern of holes corresponds to said pattern of targets;
    filling said plurality of holes with an adhesive;
    locating said transparent substrate adjacent to said first substrate such that each of said plurality of holes circumscribes a respective target of said plurality of targets;
    stripping a jacket from each optical fiber of a plurality of optical fibers of an optical fiber cable;
    inserting an end of each of a plurality of optical fibers through a respective hole of said plurality of holes and in a location with its core against said transparent substrate within a respective target of said plurality of targets using an automated manipulator in conjunction with a video feedback of each optical fiber's location with respect to its target to perform this inserting; and curing said adhesive to retain each of said plurality of optical fibers with its core within its respective target of said plurality of targets.

14. An array of optical fibers produced by a process comprising the steps of:

forming a pattern of targets on a transparent substrate;

forming a plurality of holes according to an array pattern in a first substrate, said pattern of holes corresponds to said pattern of targets;

filling said plurality of holes with an adhesive;

locating said transparent substrate adjacent to said first substrate such that each of said plurality of targets is circumscribed by a respective hole of said plurality of holes;

inserting an end of each of a plurality of optical fibers through a respective hole of said plurality of holes and in a location with its core against said transparent substrate within a respective target of said plurality of targets; and curing said adhesive to retain each of said plurality of optical fibers with its core within its respective target of said plurality of targets.

15. Apparatus for precisely inserting optical fibers from an optical fiber cable into a substrate assembly to manufacture an optical fiber array, comprising:

a base;

a support member extending from said base;

a first mounting platform attached to said support member, said first mounting platform for holding the substrate assembly during manufacture;

an optical microscope having an optical output attached to said support member having a first viewing direction for viewing the optical fibers as they are inserted in the optical fiber array;

a first video camera for receiving and converting said optical output to a first video image also attached to said support member;

a second video camera attached to said support member having a second viewing direction opposite to that of said optical microscope for viewing the optical fibers as they are inserted, thereby forming a second video image from said second viewing direction;

a second mounting platform for holding said optical fiber cable during manufacture attached to said base; and a precision fiber manipulator for grasping optical fibers of said optical fiber cable and precisely inserting each optical fiber into its respective location in the substrate assembly.

16. The apparatus according to claim 14, wherein:

said substrate has an ultraviolet light curable adhesive applied thereto for staking said optical fibers after they are inserted into their respective locations; and said support member has a means for curing said ultraviolet curable adhesive on a per fiber basis attached thereto.

* * * * *